(12) United States Patent
Roichman et al.

(10) Patent No.: US 8,472,094 B2
(45) Date of Patent: *Jun. 25, 2013

(54) VOLUMETRIC IS IMAGING OF A HOLOGRAPHIC OPTICAL TRAPS

(75) Inventors: Yohai Roichman, New York, NY (US); Ilias Cholis, Brooklyn, NY (US); David G. Grier, New York, NY (US)

(73) Assignee: New York University, New York, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 13/293,597

(22) Filed: Nov. 10, 2011

(65) Prior Publication Data

US 2012/0057213 A1 Mar. 8, 2012

Related U.S. Application Data

(60) Division of application No. 12/840,062, filed on Jul. 20, 2010, now Pat. No. 8,059,321, which is a continuation of application No. 11/974,716, filed on Oct. 16, 2007, now Pat. No. 7,835,051.

(60) Provisional application No. 60/852,252, filed on Oct. 17, 2006.

(51) Int. Cl.
| | |
|---|---|
| *G02B 5/32* | (2006.01) |
| *H01S 1/00* | (2006.01) |
| *H01S 3/00* | (2006.01) |
| *H05H 3/02* | (2006.01) |

(52) U.S. Cl.
USPC .................................. 359/15; 250/251

(58) Field of Classification Search
USPC .................................. 359/15; 250/251
See application file for complete search history.

(56) References Cited

U.S. PATENT DOCUMENTS

| 8,059,321 B2 * | 11/2011 | Roichman et al. ........... 359/15 |
| 2003/0132373 A1 | 7/2003 | Curtis et al. |
| 2005/0017161 A1 | 1/2005 | Grier et al. |
| 2005/0173622 A1 | 8/2005 | Curtis et al. |
| 2009/0170186 A1 | 7/2009 | Wu et al. |

FOREIGN PATENT DOCUMENTS

GB   2 408 587 A   6/2005

OTHER PUBLICATIONS

Dholakia et al., "Optical Tweezers: The Next Generation", *Physics World*, Oct. 2002, pp. 31-35, www.physicsweb.org.
Ashkin et al., "Observation of a Single-Beam Gradient Force Optical Trap for Dielectric Particles", *Optics Letters*, May 1986, pp. 288-290, vol. 11, No. 5, Optical Society of America.
Verma et al., "Entropic Colloidal Interactions in Concentrated DNA Solutions ", *Physical Review Letters*, Nov. 2, 1998, pp. 4004-4007, vol. 81, No. 18, The American Physical Society.
Crocker et al., "Entropic Attraction and Repulsion in Binary Colloids Probed with a Line Optical Tweezer", *Physical Review Letters*, May 24, 1999, pp. 4352-4355, vol. 82, No. 21, The American Physical Society.

(Continued)

*Primary Examiner* — Alessandro Amari
(74) *Attorney, Agent, or Firm* — Foley & Lardner LLP (57) ABSTRACT

A method and system for manipulating object using a three dimensional optical trap configuration. By use of selected hologram on optical strap can be configured as a preselected three dimensional configuration for a variety of complex uses. The system can include various optical train components, such as partially transmissive mirrors and Keplerian telescope components to provide advantageously three dimensional optical traps.

18 Claims, 6 Drawing Sheets

OTHER PUBLICATIONS

Verma et al., "Attractions Between Hard Colloidal Spheres in Semiflexible Polymer Solutions", *Macromolecules*, 2000, pp. 177-186, vol. 33, American Chemical Society.

Roichman et al., "Projecting Extended Optical Traps with Shape-Phase Holography", *Optics Letters*, Jun. 1, 2006, pp. 1675-1677, vol. 31, No. 11, Optical Society of America.

Roichman et al., "Optical Traps with Geometric Aberrations", *Applied Optics*, May 20, 2006, pp. 3425-3429, vol. 45, No. 15, Optical Society of America.

Dufresne et al., "Optical Tweezer Arrays and Optical Substrates Created with Diffractive Optics", *Review of Scientific Instruments*, May 1998, pp. 1974-1977, vol. 69, No. 5, American Institute of Physics.

Polin et al., "Optimized Holographic Optical Traps", *Optics Express*, Jul. 25, 2005, pp. 5831-5845, vol.13, No. 15, Optical Society of America.

Liesener et al., "Multi-Functional Optical Tweezers Using Computer-Generated Holograms", *Optics Communications*, Nov. 1, 2000, pp. 77-82, vol. 185, Elsevier Science B.V.

Roichman et al., "Holographic Assembly of Quasicrystalline Photonic Heterostructures", *Optics Express*, Jul. 11, 2005, pp. 5434-5439, vol. 13, No. 14, Optical Society of America.

Sasaki et al., "Pattern Formation and Flow Control of Fine Particles by Laser-Scanning.Micromanipulation", *Optics Letters*, Oct. 1, 1991, pp. 1463-1465, vol. 16, No. 19, Optical Society of America.

Faucheux et al., "Optical Thermal Ratchet", *Physical Review Letters*, Feb. 27, 1995, pp. 1504-1507, vol. 74, No. 9, The American Physical Society.

Faucheux et al., "Periodic Forcing of a Brownian Particle", *Physical Review E*, Jun. 1995, pp. 5239-5250, vol. 51, No. 6, The American Physical Society.

Biancaniello et al., "Colloidal Interactions and Self-Assembly Using DNA Hybridization", *Physical Review Letters*, Feb. 11, 2005, pp. 058302-1-058302-4, vol. 94, The American Physical Society.

Moh et al., "Multiple Optical Line Traps Using a Single Phase-Only Rectangular Ridge", *Applied Physics B, Lasers and Optics*, 2005, pp. 973-976, vol. 80, Springer-Verlag.

Chiou et al., "Interferometric Optical Tweezers", *Optics Communications*, Jan. 1, 1997, pp. 7-10, vol. 133, Elsevier Science B.V.

Schonbrun et al., "3D Interferometric Optical Tweezers Using a Single Spatial Light Modulator", *Optics Express*, May 16, 2005, pp. 3777-3786, vol. 13, No. 10, OSA.

Yu et al., "The Manipulation and Assembly of CuO Nanorods with Line Optical Tweezers", *Nanotechnology*, 2004, pp. 1732-1736, vol. 15, IOP Publishing Ltd. UK.

Goodman, Joseph W., "Introduction to Fourier Optics", Second Edition, McGraw-Hill, 1996, New York.

Born et al., "Principles of Optics—Electromagnetic Theory of Propagation, Interference and Diffraction of Light", Seventh (Expanded) Edition, Cambridge University Press, 1999.

Davis et al., "Encoding Amplitude and Phase Information onto a Binary Phase-Only Spatial Light Modulator", *Applied Optics*, Apr. 10, 2003, pp. 2003-2008, vol. 42, No. 11, Optical Society of America.

* cited by examiner

VOLUMETRIC IS IMAGING OF A HOLOGRAPHIC OPTICAL TRAPS

CROSS-REFERENCE TO RELATED PATENT APPLICATIONS

This application is a divisional of U.S. application Ser. No. 12/840,062, filed Jul. 20, 2010, which claims priority to U.S. application Ser. No. 11/974,716, filed Oct. 16, 2007, which claims priority from U.S. Provisional Application 60/852,252, filed Oct. 17, 2006, all of which are incorporated herein by reference in their entirety.

This invention is directed toward volumetric imaging of holographic optical traps. More particularly, the invention is directed to a method and system for creating arbitrary pre-selected three-dimensional (3D) configurations of optical traps having individually specified optical characteristics. Holographic techniques are used to modify individual trap wavefronts to establish pre-selected 3D structures having predetermined properties and are positionable independently in three dimensional space to carry out a variety of commercially useful tasks.

The United States Government has certain rights in this invention pursuant to a grant from the National Science Foundation through grant number DMR-0451589.

BACKGROUND OF THE INVENTION

There is a well developed technology of using single light beams to form an optical trap which applies optical forces from the focused beam of light to confine an object to a particular location in space. These optical traps, or optical tweezers, have enabled fine scale manipulation of objects for a variety of commercial purposes. In addition, line traps, or extended optical tweezers, have been created which act as a one dimensional potential energy landscape for manipulating mesoscopic objects. Such line traps can be used to rapidly screen interactions between colloidal and biological particles which find uses in biological research, medical diagnostics and drug discovery. However, these applications require methods of manipulation for projecting line traps with precisely defined characteristics which prevent their use in situations with high performance demands. Further, the low degrees of freedom and facility of use for such line traps reduces the ease of use and limits the types of uses available.

SUMMARY OF THE INVENTION

The facility and range of applications of optical traps is greatly expanded by the method and system of the invention in which 3D intensity distributions are created by holography. These 3D representations are created by holographically translating optical traps through an optical train's focal plane and acquiring a stack of two dimensional images in the process. Shape phase holography is used to create a pre-selected 3D intensity distribution which has substantial degrees of freedom to manipulate any variety of object or mass for any task.

Various aspects of the invention are described hereinafter; and these and other improvements are described in greater detail below, including the drawings described in the following section.

DETAILED DESCRIPTION OF PREFERRED EMBODIMENTS

Figure 1:
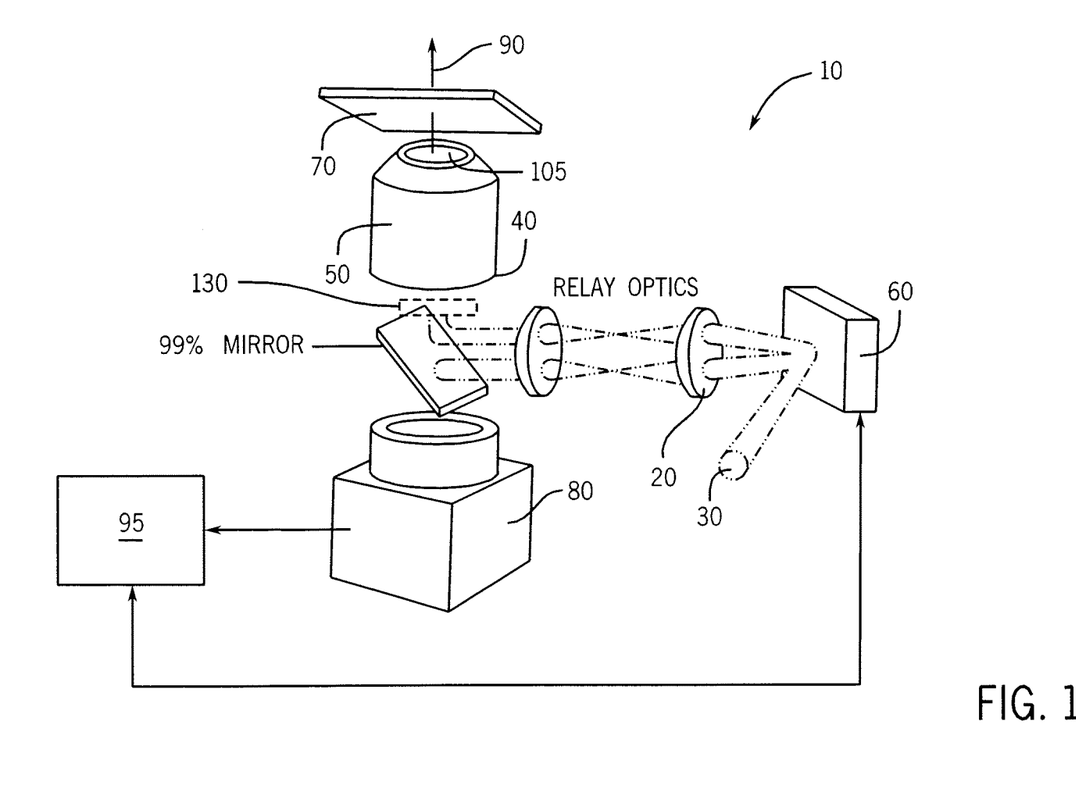
FIG. 1 illustrates an optical train for performing a method of the invention.

An optical system for performing methods of the invention is illustrated generally at 10 in FIG. 1. A beam of light 20 is output from a frequency-doubled solid-state laser 30, preferably a Coherent Verdi system operating at a wavelength of $\lambda$=532 nm. The beam of light 20 is directed to an input pupil 40 of a high-numerical-aperture objective lens 50, preferably a Nikon 100× Plan Apo, NA 1.4, oil immersion system that focuses the beam of light 20 into an optical trap (not shown). The beam of light 20 is imprinted with a phase-only hologram by a computer-addressed liquid-crystal spatial light modulator 60 ("SLM 60"), preferably a Hamamatsu X8267 PPM disposed in a plane conjugate to the objective lens' 50 input plane. Computer 95 executes conventional computer software to generate the appropriate hologram using the SLM 60. As a result, the light field, $\psi(r)$, in the objective lens' 50 focal plane is related to the field $\psi(\rho)$ in the plane of the SLM 60 by the Fraunhofer transform, $$\psi(r) = -\frac{i}{\lambda f} \int_\Omega \psi(\rho) \exp\left(-i\frac{2\pi}{\lambda f} r \cdot \rho\right) d^2\rho, \quad (1)$$

where f is the objective's focal length, where $\Omega$ is the optical train's aperture, and where we have dropped irrelevant phase factors. Assuming that the beam of light 20 illuminates the SLM 60 with a radially symmetric amplitude profile, $u(\rho)$, and uniform phase, the field in the SLM's plane may be written as, $$\psi(\rho) = u(\rho)\exp(i\phi(\rho)), \quad (2)$$

where $\phi(\rho)$ is the real-valued phase profile imprinted on the beam of light 20 by the SLM 60. The SLM 60 in our preferred form of the system 10 imposes phase shifts between 0 and $2\pi$ radians at each pixel of a 768×768 array. This two-dimensional phase array can be used to project a computer-generated phase-only hologram, $\phi(\rho)$, designed to transform the single optical tweezer into any desired three-dimensional configuration of optical traps, each with individually specified intensities and wavefront properties.

Ordinarily, the pattern of holographic optical traps would be put to use by projecting it into a fluid-borne sample mounted in the objective lens' 50 focal plane. To characterize the light field, we instead mount a front-surface mirror 70 in the sample plane. This mirror 70 reflects the trapping light back into the objective lens 50, which transmits images of the traps through the partially reflecting mirror 70 to a charge-coupled device (CCD) camera 80, preferably a NEC TI-324AII. In our implementation, the objective lens 50, the camera 80 and camera eyepiece (not shown), are mounted in a conventional optical microscope (not shown) and which is preferably a Nikon TE-2000U.

Three-dimensional reconstructions of the optical traps' intensity distribution can be obtained by translating the mirror 70 relative to the objective lens 50. Equivalently, the traps can be translated relative to the mirror 70 by superimposing the parabolic phase function, $$\varphi_z(\rho) = -\frac{\pi \rho^2 z}{\lambda f^2}, \tag{3}$$

onto the hologram $\phi_0(\rho)$ encoding a particular pattern of traps. The combined hologram, $\phi_0(\rho) = \phi_0(\rho) + \phi_z(\rho) \bmod 2\pi$, projects the same pattern of traps as $\phi_0(\rho)$ but with each trap translated by $-z$ along optical axis 90 of the system 10. The resulting image obtained from the reflected light represents a cross-section of the original trapping intensity at distance z from the focal plane of the objective lens 50. Translating the traps under software control by computer 95 is particularly convenient because it minimizes changes in the optical train's properties due to mechanical motion and facilitates more accurate displacements along the optical axis 90. Images obtained at each value of z are stacked up to yield a complete volumetric representation of the intensity distribution.

Figure 2A:
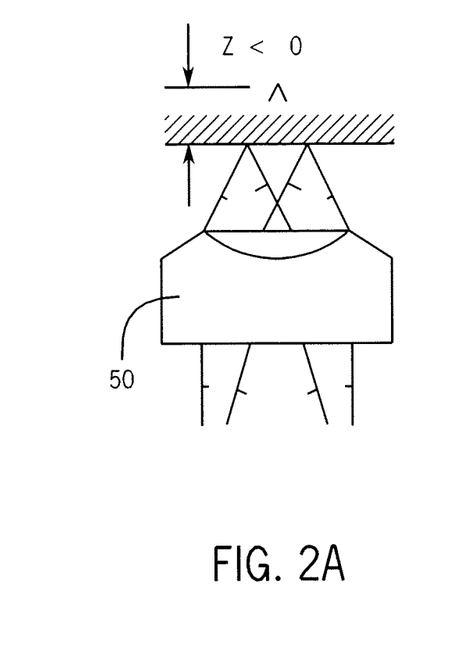
FIG. 2A illustrates a particular optical condition with z<0 for an objective lens in the system of FIG. 1.
Figure 2B:
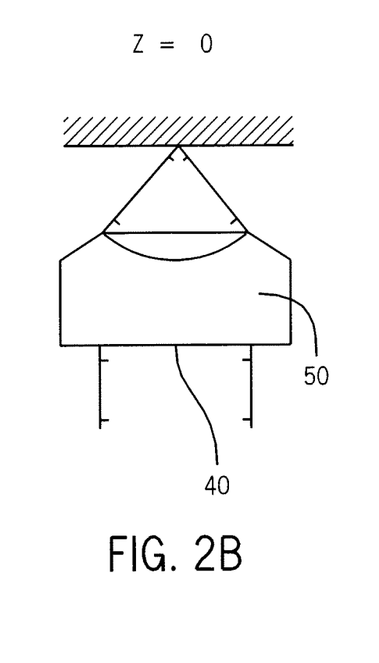
FIG. 2B illustrates the optical condition for z=0 for the objective lens of FIG. 1
Figure 2C:
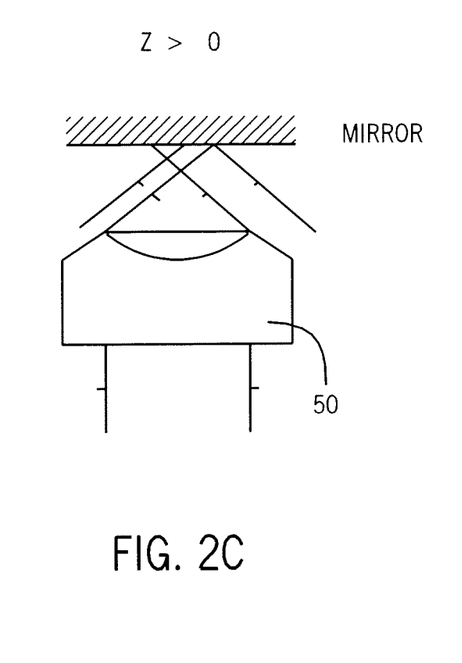
FIG. 2C illustrates the optical condition for z>0 for the objective lens of FIG. 1.

As shown schematically in FIGS. 2A-2C, the objective lens 50 captures essentially all of the reflected light for z<0. For z>0, however, the outermost rays of the converging trap are cut off by the objective lens' 50 output pupil 105, and the contrast is reduced accordingly. This could be corrected by multiplying the measured intensity field by a factor proportional to z for z>0. The appropriate factor, however, is difficult to determine accurately, so we present only unaltered results.

Figure 3A:
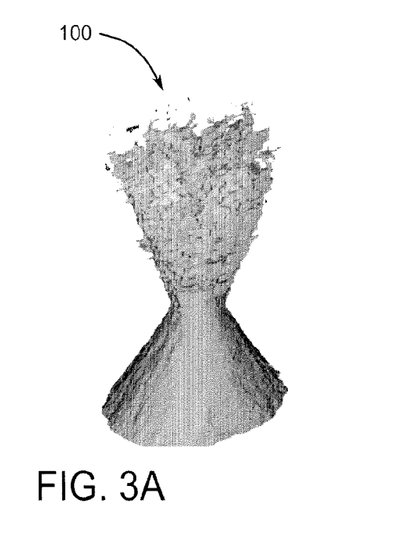
FIG. 3A illustrates a 3D reconstruction of an optical tweezer propagating along the z axis.
Figure 3B:
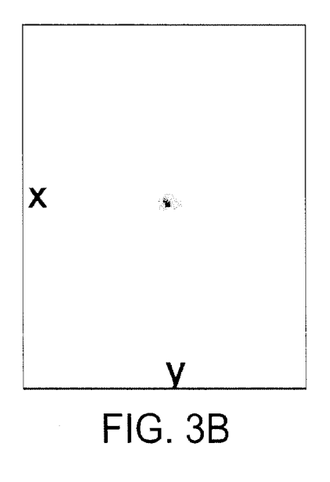
FIG. 3B illustrates a cross-section of FIG. 3A along an xy plane.
Figure 3C:
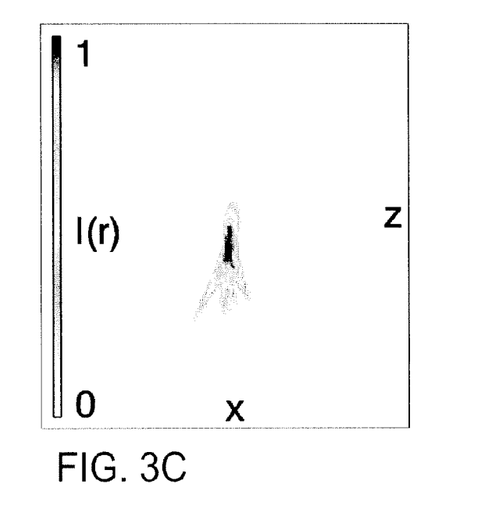
FIG. 3C illustrates a cross-section of FIG. 3A along a yz plane.
Figure 3D:
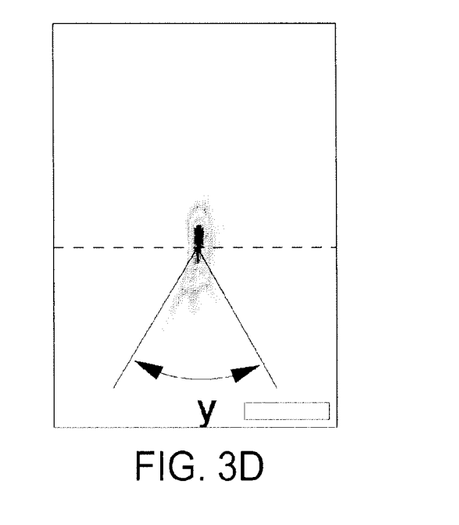
FIG. 3D illustrates a cross-section of FIG. 3A along an xz plane.

FIG. 3A shows a conventional optical tweezer 100 reconstructed in the manner described hereinbefore and displayed as an isointensity surface at 5 percent peak intensity and in three cross-sections (FIGS. 3B-3D). The representation in FIG. 3A is useful for showing the overall structure of the converging light, and the cross-sections of FIGS. 3B-3D provide an impression of the three dimensional light field that will confine an optically trapped object. The angle of convergence of 63° in immersion oil obtained from these data is consistent with an overall numerical aperture of 1.4. The radius of sharpest focus, $r_{min} \approx 0.2$ µm, is consistent with diffraction-limited focusing of the beam of light 20.

These results highlight two additional aspects of this reconstruction technique. The objective lens 50 is designed to correct for spherical aberration when the beam of light 20 passing through water is refracted by a glass coverslip. Without this additional refraction, the projected optical trap 100 actually is degraded by roughly 20λ of spherical aberration, introduced by the objective lens 50. This reduces the apparent numerical aperture and also extends the trap's focus along the z axis. The trap's effective numerical aperture in water would be roughly 1.2. The effect of spherical aberration can be approximately corrected by pre-distorting the beam of light 20 with the additional phase profile, $$\varphi_a(\rho) = \frac{a}{\sqrt{2}}(6x^4 - 6x^2 + 1), \tag{4}$$

the Zernike polynomial describing spherical aberration. The radius, x, is measured as a fraction of the optical train aperture, and the coefficient a is measured in wavelengths of light. This procedure is used to correct for small amount of aberration present in practical optical trapping systems to optimize their performance.

Figure 3E:
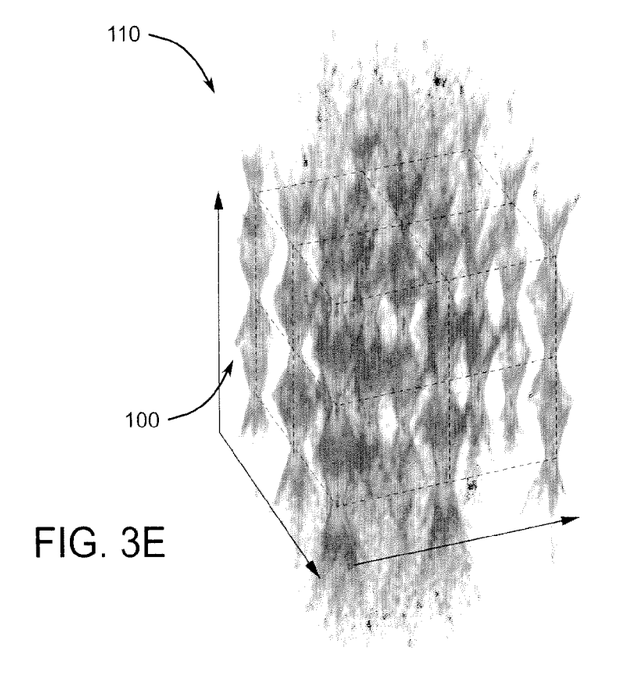
FIG. 3E illustrates a volumetric reconstruction of 35 optical tweezers arranged in a body-centered cubic lattice of the type shown in FIG. 3F.
Figure 3F:
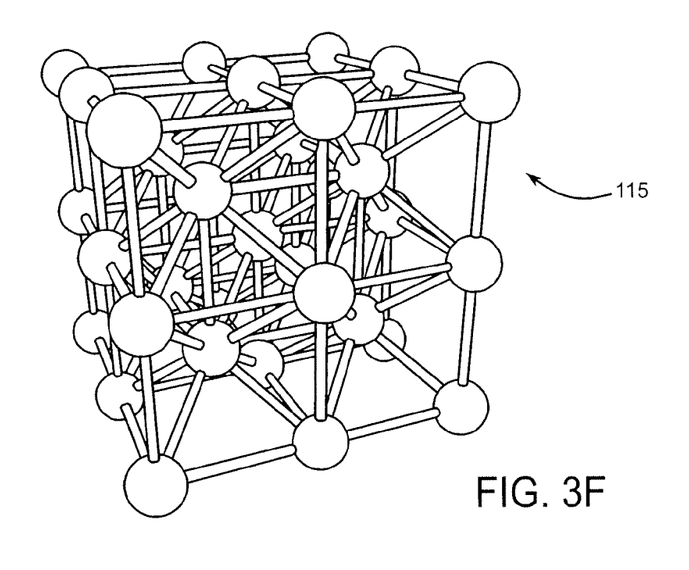

This correction was applied to an array 110 of 35 optical tweezers shown as a three-dimensional reconstruction in FIG. 3E. These optical traps 100 are arranged in a three-dimensional body-centered cubic (BCC) lattice 115 shown in FIG. 3F with a 10.8 µm lattice constant. Without correcting for spherical aberration, these traps 100 would blend into each other along the optical axis 90. With correction, their axial intensity gradients are clearly resolved. This accounts for holographic traps' ability to organize objects along the optical axis.

Correcting for aberrations reduces the range of displacements, z, that can be imaged. Combining $\phi_a(\rho)$ with $\phi_z(\rho)$ and $\phi_0(\rho)$ increases gradients in $\phi(\rho)$, particularly for larger values of $\rho$ near the edges of the diffraction optical element. Diffraction efficiency falls off rapidly when $|\nabla \phi(\rho)|$ exceeds $2\pi/\Delta\rho$, the maximum phase gradient that can be encoded on the SLM 60 with pixel size $\Delta\rho$. This problem is exacerbated when $\phi_0(\rho)$ itself has large gradients. In a preferred embodiment more complex trapping patterns without aberration are prepared. In particular, we use uncorrected volumetric imaging to illustrate the comparative advantages of the extended optical traps 100.

The extended optical traps 100 have been projected in a time-shared sense by rapidly scanning a conventional optical tweezer along the trap's intended contour. A scanned trap has optical characteristics as good as a point-like optical tweezer, and an effective potential energy well that can be tailored by adjusting the instantaneous scanning rate Kinematic effects due to the trap's motion can be minimized by scanning rapidly enough. For some applications, however, continuous illumination or the simplicity of an optical train with no scanning capabilities can be desirable.

Figure 4A:
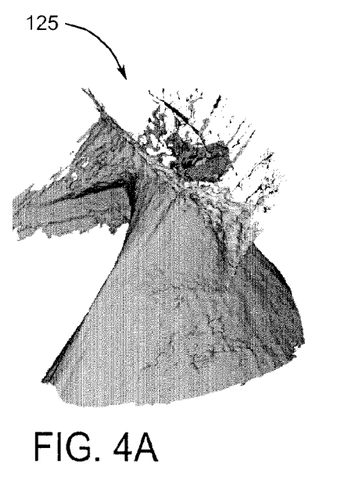
FIG. 4A illustrates a 3D reconstruction of a cylindrical lens line optical tweezer.
Figure 4B:
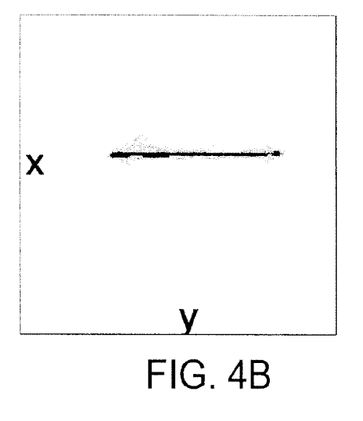
FIG. 4B illustrates a cross-section of FIG. 4A along an xy plane.
Figure 4C:
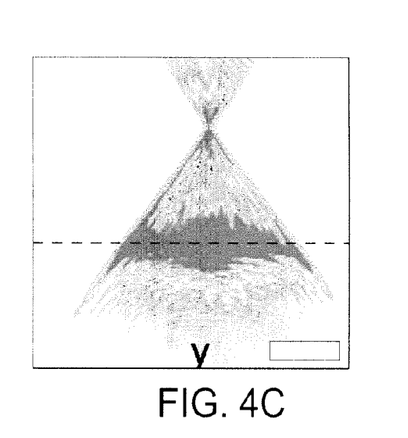
FIG. 4C illustrates a cross-section of FIG. 4A along a yz plane.
Figure 4D:
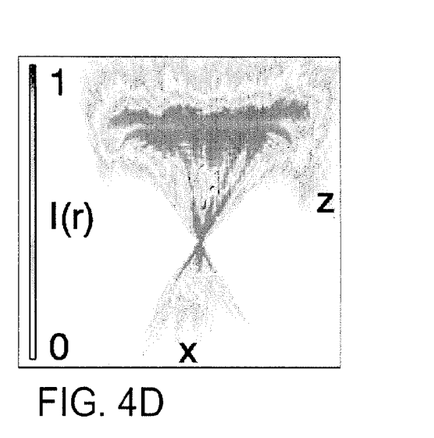
FIG. 4D illustrates a cross-section of FIG. 4A along an xz plane.

Continuously illuminated line traps have been created by expanding an optical tweezer 125 along one direction (see FIG. 4A). This can be achieved, for example, by introducing a cylindrical lens component such as by element 130 (see FIG. 1) into the objective's input plane. Equivalently, a cylindrical-lens line tweezer can be implemented by encoding the function $\phi_c(\rho) = \pi z_0 \rho_x^2/(\lambda f^2)$ on the SLM 60. The result, shown in FIGS. 4A-4D appears best useful in the plane of best focus, $z=z_o$, with the point-like tweezer having been extended to a line with nearly parabolic intensity and a nearly Gaussian phase profile. The three-dimensional reconstruction, however, reveals that the cylindrical lens component merely introduces a large amount of astigmatism into the beam of light 20, creating a second focal line perpendicular to the first. This is problematic for some applications because the astigmatic beam's axial intensity gradients are far weaker than a conventional optical tweezer's. Consequently, cylindrical-lens line traps typically cannot localize objects against radiation pressure along the optical axis 90.

Replacing the single cylindrical lens with a cylindrical Keplerian telescope for the element 130 eliminates the astigmatism and thus creates a stable three-dimensional optical trap. Similarly, using the objective lens 50 to focus two interfering beams creates an interferometric optical trap capable of three-dimensional trapping. These approaches, however, offer little control over the extended traps' intensity profiles, and neither affords control over the phase profile.

Figure 5A:
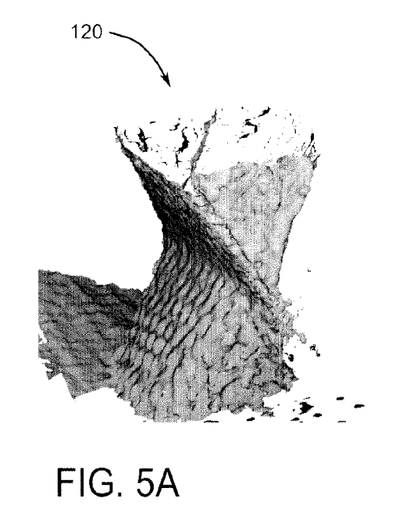
FIG. 5A illustrates a 3D reconstruction of a holographic optical trap featuring diffraction-limited convergence to a single focal plane.
Figure 5B:
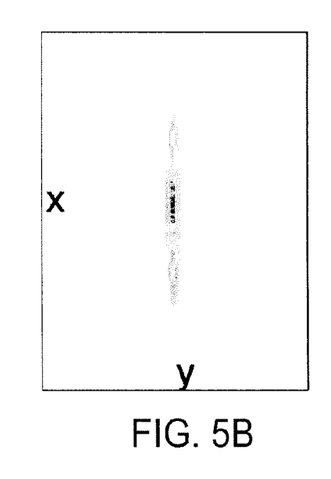
FIG. 5B illustrates a cross-section of FIG. 5A along a xy plane.
Figure 5C:
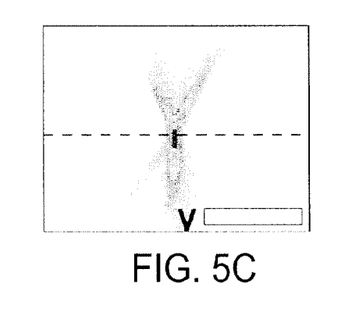
FIG. 5C illustrates a cross-section of FIG. 5A along a yz plane.
Figure 5D:
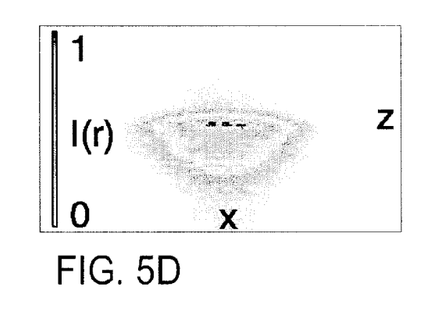
FIG. 5D illustrates a cross-section of FIG. 5A along an xz plane.

Shape-phase holography provides absolute control over both the amplitude and phase profiles of an extended form of the optical trap 100 at the expense of diffraction efficiency. It also yields traps with optimized axial intensity gradients, suitable for three-dimensional trapping. If the line trap is characterized by an amplitude profile $\tilde{u}(\rho_x)$ and a phase profile $\tilde{p}(\rho_x)$ along the $\hat{\rho}_x$ direction in the objective's focal plane, then the field in the SLM plane is given from Eq. (1) as, $$\psi(\rho) = u(\rho_x)\exp(ip(\rho_x)), \quad (5)$$

where the phase $p(\rho_x)$ is adjusted so that $u(\rho_x) \geqq 0$. Shape-phase holography implements this one-dimensional complex wavefront profile as a two-dimensional phase-only hologram, $$\varphi(\rho) = \begin{cases} p(\rho_x), & S(\rho) = 1 \\ q(\rho), & S(\rho) = 0, \end{cases} \quad (6)$$

where the shape function $S(\rho)$ allocates a number of pixels along the row $\rho_y$ proportional to $u(\rho_x)$ One particularly effective choice is for $S(\rho)$ to select pixels randomly along each row in the appropriate relative numbers. The unassigned pixels then are given values $q(\rho)$ that redirect the excess light away from the intended line. Typical results are presented in FIG. 5A.

Unlike the cylindrical-lens trap, the holographic line trap 130 in FIGS. 5A-5D focuses as a conical wedge to a single diffraction-limited line in the objective's focal plane. Consequently, its transverse angle of convergence is comparable to that of an optimized point trap. This means that the holographic line trap 120 has comparably strong axial intensity gradients, which explains its ability to trap objects stably against radiation pressure in the z direction.

The line trap's transverse convergence does not depend strongly on the choice of intensity profile along the line. Its three-dimensional intensity distribution, however, is very sensitive to the phase profile along the line. Abrupt phase changes cause intensity fluctuations through Gibbs phenomenon. Smoother variations do not affect the intensity profile along the line, but can substantially restructure the beam. The line trap 120 created by the cylindrical lens element 130 for example, has a parabolic phase profile. Inserting this choice into Eq. (2) and calculating the associated shape-phase hologram with Eqs. (1) and (6) yields the same cylindrical lens phase profile. This observation opens the door to applications in which the phase profile along a line can be tuned to create a desired three-dimensional intensity distribution, or in which the measured three-dimensional intensity distribution can be used to assess the phase profile along the line. These applications will be discussed elsewhere.

The foregoing description of embodiments of the present invention have been presented for purposes of illustration and description. It is not intended to be exhaustive or to limit the present invention to the precise form disclosed, and modifications and variations are possible in light of the above teachings or may be acquired from practice of the present invention. The embodiments were chosen and described in order to explain the principles of the present invention and its practical application to enable one skilled in the art to utilize the present invention in various embodiments, and with various modifications, as are suited to the particular use contemplated.

What is claimed is:

1. A method of obtaining a cross-section of the trapping intensity of trapping light, comprising the steps of:
   providing an optical train;
   providing a beam of light to the optical train;
   applying a predetermined hologram to the beam of light to generate trapping light;
   reflecting the trapping light off a mirror; and
   obtaining a plurality of separate cross-sections of trapping intensity of the trapping light from the reflected light, thereby creating a volumetric reconstruction of the trapping intensity.

2. The method as defined in claim 1 further including the step of at least one of (1) providing a front surface mirror to perform at least one of a three dimensional reconstruction, volumetric imaging and characterization of the light field of the trapping light and (2) generating a modified parabolic phase function form of the predetermined hologram to translate the trapping light relative to a fixed form of the front surface mirror to perform at least one of a three dimensional reconstruction, volumetric imaging and characterization of the light field of the trapping.

3. The method as defined in claim 2 wherein the trapping light is reflected off the front surface mirror into an objective lens and further transmits images of the trapping light through a partially reflecting mirror.

4. The method as defined in claim 2 wherein the trapping light is reflected off the front surface mirror into an objective lens and further transmits images of the trapping light through a partially reflecting mirror into a camera.

5. The method as defined in claim 2 wherein the modified parabolic phase function comprises, $$\varphi_z(\rho) = -\frac{\pi\rho^2 z}{\lambda f^2}$$

where,
φ=phase value at position ρ;
z=distance along an optical axis of the optical train;
λ=wavelength of the light;
f=objective lens focal length;
ρ=position in the hologram.

6. The method as defined in claim 1 wherein the trapping light is reflected off at least one of a front surface mirror into an objective lens and a front surface mirror in a sample plane.

7. The method as defined in claim 6 wherein an image is constructed from the light reflected off the front surface mirror and the image represents a cross-section of the trapping intensity at a particular distance from a focal plane of the objective lens.

8. The method as defined in claim 6 wherein an image is constructed from the light reflected off the front surface mirror and which represents the cross-section of the trapping intensity at a particular distance from a focal plane of the objective lens and wherein the cross section is reconstructed at a plurality of distances z from the focal plane and are used to create a volumetric representation of the trapping intensity.

9. The method as defined in claim 8 wherein the trapping light is translated relative to the front surface mirror by superimposing a phase function.

10. The method as defined in claim 1 wherein the trapping light is translated relative to the mirror.

11. The method as defined in claim 1 wherein the trapping light is translated relative to the mirror by superimposing a phase function.

12. The method as defined in claim 11 wherein the phase function comprises a parabolic phase function.

13. The method as defined in claim 1 wherein the cross-section is reconstructed at a plurality of distances z from a focal plane of the optical train.

14. The method as defined in claim 1 wherein the optical train includes a spatial light modulator and the step of applying the predetermined hologram includes using a computer executing a computer program to control the spatial light modulator to generate the predetermined hologram.

15. The method as defined in claim 14 wherein the predetermined hologram comprises a phase only hologram.

16. The method as defined in claim 15 wherein the phase only hologram is applied to the trapping light for modifying wavefronts of the trapping light.

17. The method as defined in claim 15 wherein the phase only hologram has a profile which comprises, $$\varphi_a(\rho) = \frac{a}{\sqrt{2}}(6x^4 - 6x^2 + 1),$$

thereby correcting for spherical aberration where x is distance in a plane perpendicular to an optical axis of the optical train.

18. The method as defined in claim 14 wherein the computer program is further executed by the computer to create the predetermined hologram for translating the trapping light.

* * * * *